United States Patent
Deianov et al.

(10) Patent No.: US 6,529,985 B1
(45) Date of Patent: Mar. 4, 2003

(54) SELECTIVE INTERCEPTION OF SYSTEM CALLS

(75) Inventors: Borislav D. Deianov, Rousse (BG); Xun Wilson Huang, Mountian View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/499,098

(22) Filed: Feb. 4, 2000

(51) Int. Cl.[7] .............................................. G06F 13/24
(52) U.S. Cl. ...................................... 710/260; 709/107
(58) Field of Search ................................ 710/260–269; 709/107

(56) References Cited

U.S. PATENT DOCUMENTS

| | | | |
|---|---|---|---|
| 3,377,624 A | 4/1968 | Nelson et al. | |
| 4,177,510 A | 12/1979 | Appell et al. | 364/200 |
| 5,212,793 A | * 5/1993 | Donica et al. | 709/105 |
| 5,249,290 A | * 9/1993 | Heizer | 709/105 |
| 5,263,147 A | 11/1993 | Francisco et al. | 395/425 |
| 5,437,032 A | * 7/1995 | Wolf et al. | 709/103 |
| 5,603,020 A | 2/1997 | Hashimoto et al. | 395/616 |
| 5,636,371 A | * 6/1997 | Yu | 340/825.52 |
| 5,692,047 A | 11/1997 | McManis | 380/4 |
| 5,706,097 A | 1/1998 | Schelling et al. | 358/296 |
| 5,706,453 A | * 1/1998 | Cheng et al. | 345/763 |
| 5,708,774 A | * 1/1998 | Boden | 706/13 |
| 5,761,477 A | 6/1998 | Wahbe et al. | 395/406 A |
| 5,781,550 A | 7/1998 | Templin et al. | 370/401 |
| 5,809,527 A | 9/1998 | Cooper et al. | 711/133 |
| 5,828,893 A | 10/1998 | Weld et al. | 395/800 |
| 5,838,916 A | 11/1998 | Domenikos et al. | 395/200.49 |
| 5,842,002 A | 11/1998 | Schnurer et al. | 395/500 |
| 5,845,129 A | 12/1998 | Wendorf et al. | 395/726 |
| 5,913,024 A | 6/1999 | Green et al. | 395/186 |
| 5,915,085 A | 6/1999 | Koved | 395/186 |
| 5,918,018 A | 6/1999 | Gooderum et al. | 395/200.55 |
| 5,937,159 A | 8/1999 | Meyers et al. | 395/187.01 |
| 5,956,481 A | 9/1999 | Walsh et al. | 395/186 |
| 6,023,721 A | 2/2000 | Cummings | 709/201 |
| 6,065,118 A | 5/2000 | Bull et al. | 713/200 |
| 6,075,938 A | 6/2000 | Bugnion et al. | 395/500.48 |
| 6,108,759 A | 8/2000 | Orcutt et al. | 711/173 |
| 6,167,520 A | 12/2000 | Touboul | 713/200 |
| 6,192,389 B1 | 2/2001 | Ault et al. | 709/101 |
| 6,192,512 B1 | 2/2001 | Chess | 717/5 |

OTHER PUBLICATIONS

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

(List continued on next page.)

*Primary Examiner*—Rupal Dharia
(74) *Attorney, Agent, or Firm*—Fenwick & West LLP

(57) ABSTRACT

System calls are selectively intercepted by processes. Processes selected to intercept system calls are loaded by a modified loader program which creates an association between the process and a system call wrapper. Pointers in the interrupt vector table to system calls to be intercepted are replaced with pointers to an interception module in operating system address space. When system calls are made, the interception module executes and determines whether the process that made the system call is a selected process, associated with a system call wrapper. If the process is a selected process, the system call wrapper executes. If the process is not a selected process, the system call is made. In one embodiment, system call wrappers execute in the process address space of selected processes. In another embodiment, system call wrappers execute in user address space, but not in the process address space of any specific processes. In yet another embodiment, system call wrappers execute in operating system address space.

72 Claims, 3 Drawing Sheets

OTHER PUBLICATIONS

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring–97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," Ser. No. 09/452,286, filing date Nov. 30, 1999.

Pending United States patent application entitled "Dynamic Scheduling of Task Streams in a Multiple–Resource System to Ensure Task Stream Quality of Service," Ser. No. 09/498,450, filing date Feb. 4, 2000.

Keshav, S., *An Engineering Approach to Computer Networking: ATM Networks, the Internet, and the Telephone Network,* Reading, MA, Addison–Wesley, 1997, pp. vii–xi, 85–115, 209–355, 395–444.

Stevens, R. W., *UNIX Network Programming Volume 1 Networking APIs: Sockets and XTI,* Upper Saddle River, NJ, Prentice Hall, 1998, pp v–xiv, 29–53, 85–110, 727–760.

Tanenbaum, A. S. and Woodhull, A. S., *Operating Systems: Design and Implementation,* Upper Saddle River, NJ, Prentice Hall, 1997, pp vii–xiv, 1–46, 401–454.

Rubini, A. *LINUX Device Drivers,* Sebastopol, CA, O'Reilly & Associates, Inc., 1998, pp v–x, 13–40.

Goyal, P., et al., "A Hierarchical CPU Scheduler for Multimedia Operating Systems," *Proceedings of the Second Symposium on Operating Systems Design and Implementations* (OSDI'96), Seattle, WA, Oct. 1996, 15 pages.

Laurie, B. and Laurie, P., *Apache The Definitive Guide,* Sebastopol, CA, O'Reilly & Associates, Inc., Feb. 1999, pp. v–viii, 43–74.

Aho, A. V. and Ullman J. D., *Principles of Complier Design,* Reading, MA, 1977, pp. vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in–Progress session,* San Francisco, CA, Dec. 4, 1997, pp 31–34.

Rusling, D. A., Processes, [online], [retrieved on Dec. 7, 1999]. Retrieved from the Internet: <URL: http://www.cebaf.gov/~saw/linux/tlk–html/node44.html>.

Rusling, D. A., Linux Processes, [online], [retrieved on Dec. 7, 1999]. Retrieved from the Internet: <URL: http://www.cebaf.gov/~saw/linux/tlk–html/node45.html>.

Rusling, D. A., Identifiers, [online], [retrieved on Dec. 7, 1999]. Retrieved from the Internet: <URL: http://www.cebaf.gov/~saw/linux/tlk–html/node46.html>.

Rusling, D. A., Scheduling, [online], [Retrieved on Dec. 7, 1999]. Retrieved from the Internet: <URL:http://www.cebaf.gov/~saw/linux/tlk–html/node47.html>.

Rusling, D. A., Scheduling in Multiprocessor Systems, [online], [retrieved on Dec. 7, 1999]. Retrieved from the Internet: <URL: http://www.cebaf.gov/~saw/linux/tlk–html/node48.html>.

Rusling, D. A., Files, [online], [retrieved on Dec. 7, 1999]. Retrieved from the Internet: <URL: http://www.cebaf.gov/saw/linux/tlk–html/node49.html>.

Plummer, D. C., *An Ethernet Address Resolution Protocol— or —Converting Network Protocol Addresses to 48.bit Ethernet Address for Transmission on Ethernet Hardware,* Nov. 1982, [online], [retrieved on Jan. 17, 2000]. Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99,* Mar. 1999, nine pages.

Duffield, N.G., et al., "A Flexible Model for Resource Management in Virtual Private Networks," *Computer Communications Review Conference, Computer Communication,* ACM SIGCOMM '99 Conference, Cambridge, MA, Aug. 30, 1999–Sep. 3, 1999. pp 95–108.

Campbell, A. T. and Keshav, S., "Quality of Service in Distributed Systems," *Computer Communications 21,* 1998, pp 291–293.

Bach, M. J., *The Design of the Unix® Operating System,* New Delhi, Prentice–Hall of India, 1989, pp v–x, 19–37.

McDougall, R., et al., *Resource Management,* Upper Saddle River, NJ, Prentice Hall, 1999, pp iii–xix, 135–191.

Rijsinghani, A., RFC 1624, May 1994, [online], [retrieved Feb. 2, 2000]. retrieved from the internet: <URL: http://www.faqs.org/rfcs/rfc1624.html>.

Mallory, T and Kullberg, A., RFC 1141, Jan. 1990 [online], [retrieved Feb. 2, 2000]. retrieved from the Internet: <URL: http://www.faqs.org/rfcs/rfc1141.html>.

Egevang, K. and Francis P., RFC 1631, May 1994 [online], [retrieved Feb. 2, 2000]. retrieved from the Internet: <URL: http://www.faqs.org/rfcs/rfc1631.html>.

Boehm, B., "Managing Software Productivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp 335–344.

Deutsch, P. and Grant, C.A., "A Flexible Measurement Tool for Software Systems," Information Processing 71 (Proc. of the IFIP Congress), 1971, pp. 320–326.

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp 1–17.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp 34–45.

Pandey, R. and Hashii, B., "Providing Fine–Grained Access Control For Mobile Programs Through Binary Editing," Technical Report TR98 08, University of California, Davis, CA, 1998, pp 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

\* cited by examiner

SELECTIVE INTERCEPTION OF SYSTEM CALLS

BACKGROUND

1. Field of Invention

The present invention relates generally to intercepting system calls made to multitasking operating systems, and specifically to selective interception of system calls made by specific processes;

2. Background of Invention

Multitasking operating systems such as UNIX and Microsoft Windows NT® are widely utilized in commercial computing systems. Among their many commercial uses, multitasking operating systems are commonly deployed on Internet and other network server computers. With the popularity and success of the Internet, server computer operating systems are currently of great commercial importance.

Although multitasking operating systems include various internal resources, it is often desirable to customize or extend operating system functionality for a particular use on a server computer. Such customization allows a computer programmer, a network administrator, or a webmaster to utilize the operating system in a specific manner beyond the default system capabilities provided by the manufacturer of the operating system. One method of extending and expanding operating system functionality is the interception of system calls.

A system call is a subroutine, the object code of which is located in an operating system, such that the subroutine can be called by processes executing under the control of the operating system. When executed, a system call performs some system operation, such as the access of a system hardware or software resource. Examples of operations executed by system calls include reading data from a file, opening a network communication channel, and allocating computer memory to a specific process. Application programs (processes) executing under the control of the operating system call a subroutine (make a system call) in order to bring about the performance of these and other system operations.

In order to make a system call, arguments are programmatically loaded into specific registers of the central processing unit of the computer on which the operating system is executing. One of these arguments identifies the specific system call that is being made. This argument is typically in the form of a number that is an offset into the operating system interrupt vector table, which contains pointers to the actual executable code of the system calls. The other loaded arguments include parameters to be passed to the system call.

Once the arguments have been loaded, a software interrupt is generated, signaling to the operating system that a process is requesting execution of a system call. The operating system reads the registers, and executes the requested system call with the specified parameters. The system call executes and performs the desired functionality. If the system call generates a return value, it places the generated return value (or a pointer thereto) in a pre-designated register where it can be accessed by the calling process.

In order to intercept a system call, a pointer in an interrupt vector table to a system call is replaced with a pointer to alternative object code to be executed instead of the system call. Then, when the system call is made, the alternative object code will execute instead. The alternative object code is known as a system call wrapper.

The interception of system calls is useful to extend and customize operating system functionality. For example, the interception of system calls can be used to manipulate operating system access privileges to provide security beyond that which is provided by the operating system. Through the interception of system calls that provide access to the file system, processes can be prevented from manipulating files. This is desirable, for example, when a user wishes to remotely execute a program residing on a web server, but does not want the remote program to be able to read or alter private data on the user's computer. Today, Java applets are commonly employed to provide such security. However, many programs which users wish to remotely execute are written in languages other than Java. System call interception allows programs written in any language to be safely executed remotely.

The interception of system calls in multitasking operating systems is known today, although it is an advanced systems programming technique. Multitasking operating system call interception is not widely employed in commercial programming, but select expert systems programmers utilize the technique. Nonetheless, two serious shortcomings limit the usefulness of system call interception as it is known today.

First, when a system call is intercepted, the system call wrapper is executed whenever any process executing under the control of the operating system makes the intercepted system call. No mechanism presently exists to allow selective interception of a system call by only certain processes. It would be desirable to selectively intercept system calls such that only certain processes execute the wrapper, whereas other processes execute the default system call. For example, if file system access calls are intercepted as described above, no processes will be able to access the standard file system calls. Although it is desirable for remotely executed processes to be so restricted, this may not be the case for many local processes which should be allowed access to the file system without restriction. Thus, it is desirable to have a method whereby system calls could be selectively intercepted such that only select processes execute the system call wrapper when a system call is made.

Another shortcoming with current system call interception technology is difficulty of development. System call wrappers are inserted into the operating system, usually by loading a module into an active operating system kernel. Thus, system call wrappers execute in a part of computer memory reserved for the operating system (operating system address space).

System call wrappers, like all computer programs, require extensive testing and debugging during the development cycle. When a computer program is being developed and tested, it inevitably generates execution errors and performs illegal instructions many times before it is debugged and complete. Often, this results in the computer program becoming "locked up" because it has overwritten some of its own control memory, or because it is executing an infinite loop, or the like.

Normally, multitasking operating system application programs execute in an area of computer memory reserved for non-system processes (user address space). Each program (process) is assigned, by the operating system, a private block of computer memory in user address space in which it can execute. This block of memory is known as the process address space of the associated process. Therefore, when a program generates execution errors during development, other processes, and the operating system itself, are not effected. Even if an individual process locks up, other processes continue to execute, and operating system resources can be utilized to terminate the locked process so that development may continue.

System call wrappers execute in operating system address space, and therefore system call wrapper execution errors effect the entire system. When a wrapper generates execution errors, it can overwrite operating system resources such as the interrupt vector table or memory map. This requires that all processes executing under control of the operating system be terminated, and that the operating system be restarted. This has the potential to be extremely costly, as processes can be executing important commercial functionality (i.e. bank wire transfers) at the time the system terminates. Even where no critical data is lost, system downtime is expensive and undesirable.

What is needed is a method by which system calls are selectively intercepted such that the system call wrapper only executes when a system call is made by select processes. When the system call is made by a non-select process, the default system call is executed. Additionally, a method by which system call wrappers execute in process address space would be desirable, in order to avoid the expense and other hazards associated with executing system call wrappers in operating system address space.

SUMMARY OF INVENTION

The present invention allows the selective interception of systems calls by specific processes. Additionally, the present invention allows a system call wrapper to execute in process address space of computer memory.

In one preferred embodiment, an interception module is loaded into the operating system. Pointers in the interrupt vector table to system calls to be intercepted are replaced with pointers to the interception module. Select processes that are to intercept system calls are loaded into process address space by a modified loader program.

A loader program is an operating system utility that is used to execute computer programs that are stored on static media. Typically, a loader program loads an executable image from static media into process address space, and then initiates execution of the loaded image by transferring execution to the first instruction thereof.

Like a standard loader program, the modified loader of the present invention loads executable images from static media into process address space. Additionally, the modified loader loads an initialization module and a system call wrapper into the process address space of the loaded executable image. Each select process that is to intercept system calls is loaded by the modified loader program, whereas non-selected processes are loaded with a standard loader.

Rather than executing the loaded image itself, the modified loader executes the loaded initialization module. The initialization module registers an entry point in the system call wrapper with the interception module. The interception module maintains an association table of the select processes and system call wrapper entry points In this fashion, the interception module can determine the entry point in each system call wrapper unique to each user process.

In an alternative embodiment, a modified loader program is utilized to load both selected and non-selected processes. In that embodiment, a list of selected processes is stored in computer memory. The loader utilizes the list to determine if a process to be loaded is selected. If so, the modified loader program loads the process, the system call wrapper, and the initialization module, as described above. If the process is not selected, the loader simply loads the process in the manner of the default loader program.

When an intercepted system call is made by a process, the operating system uses the pointer in the interrupt vector table to execute the interception module (non-intercepted system calls execute normally). The interception module determines from the association table whether the calling process is one of the selected processes with a registered entry point in a system call wrapper. If so, the interception module prepares to call the appropriate system call wrapper.

Before calling the system call wrapper, the interception module first determines whether the system call was made by the wrapper, so as to avoid unwanted system call wrapper recursion. System call wrappers, like other processes, can make system calls. When a wrapper makes a system call, the interception module proceeds to call the system call, not to recursively call the wrapper.

If the system call was not made by the wrapper, the interception module stores an address to which execution control is to be returned once execution of the system call wrapper has completed. Then, the interception module proceeds to call the system call wrapper, which executes in the process address space of the calling process.

If it is determined that the process that called the system call is not one of the processes which have been selected to intercept system calls, the interception module transfers execution to the default system call, which executes as if it had been called by the process directly.

Thus, the present invention provides both selective interception of system calls by specific processes and execution of system call wrappers in process address space. Only select processes are executed by the modified loader, and thus only these select processes have a system call wrapper loaded into their process address space. When a system call is made by one these select processes, the interception module calls the system call wrapper with which the process is associated. When system calls are made by non-select processes, the interception module calls the default system call. Therefore, a system administrator of a multitasking operating system can determine which select processes will intercept which select system calls, thereby overcoming the above described limitation of the prior art.

Furthermore, the present invention overcomes the hazards associated with executing system call wrappers in operating system address space. Because the system call wrappers execute in process address space, system call wrapper execution errors do not effect other processes or the operating system itself. This results in an ease of development and a level of operating system stability heretofore unavailable using system call wrappers.

In another embodiment of the present invention, system call wrappers are loaded into user address space, but not into the process address space of any specific process. In this embodiment, when a process is loaded into memory the modified loader program loads a system call wrapper into user address space and executes the loaded wrapper. The wrapper registers an entry point in itself with the interception module. The interception module updates the association table to include an association between the process being loaded and the registered system call wrapper entry point. The modified loader then loads and executes the process. When the process makes a system call, the operating system uses the pointer in the interrupt vector table to execute the interception module. The interception module determines from the association table whether the calling process is one of the selected processes with a registered entry point in a system call wrapper. If not, the calling process is not one of the processes which have been selected to intercept system calls, so the interception module makes the default system call for the process. If so, the interception module calls the wrapper.

This embodiment of the present invention also overcomes the failings of the prior art. Only select processes are loaded by the modified loaded program, and thus only select processes are associated with a system call wrapper. This facilitates selective interception of system calls by specific processes only. Furthermore, the system call wrappers execute in user address space, thereby overcoming the hazards associated with operating system address space execution of system call wrappers.

In another embodiment, a system call wrapper executes in operating system address space, but system call interception is still selective. Interrupt vector table pointers to system calls to be intercepted are replaced with pointers to the system call wrapper, and the original pointers to the system calls are saved. The system call wrapper maintains an identifier table that indicates which processes have been selected to intercept which system calls. When a system call is made, the wrapper executes and determines whether the calling process has been selected to intercept the system call that was made. If so, the wrapper executes. Otherwise, the wrapper utilizes the saved pointer to make the default system call. This embodiment also provides for system call interception selectivity.

DETAILED DESCRIPTION OF THE PREFERRED EMBODIMENTS

SYSTEM CALL WRAPPERS IN PROCESS ADDRESS SPACE OF SELECTED PROCESSES

Figure 1:
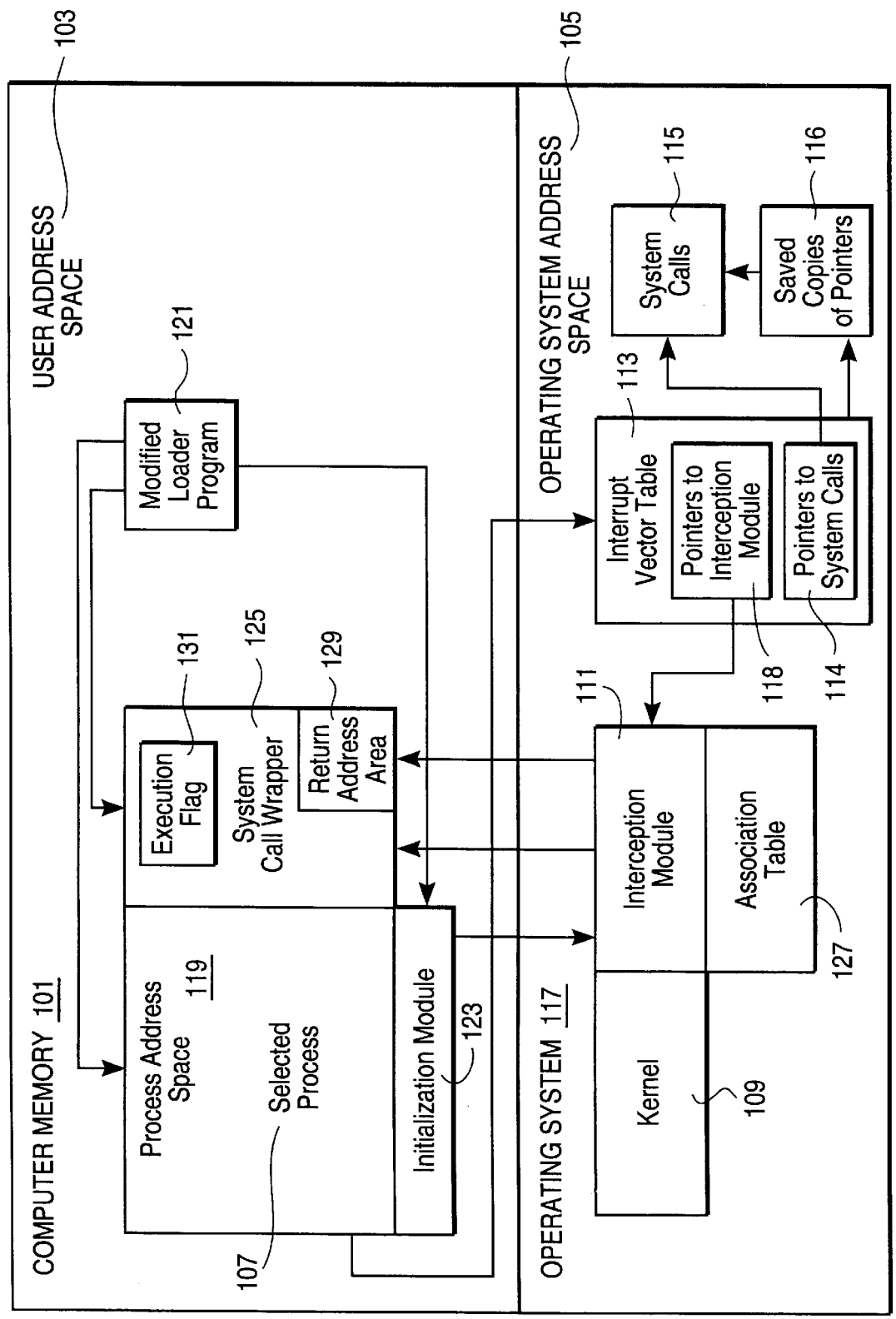
FIG. 1 is a block diagram illustrating a system for selectively intercepting system calls according to a preferred embodiment of the present invention.

FIG. 1 is a high level block diagram illustrating a system for selectively intercepting system calls 115 according to one embodiment of the present invention. In the embodiment of FIG. 1, system call wrappers 125 execute in the process address space 119 of selected processes 107.

A computer memory 101 includes user address space 103 and operating system address space 105. In the user address space 103 a process 107 executes. Although FIG. 1 illustrates only a single process 107 executing in user address space 103, it is to be understood that within a given computer memory 101, multiple processes 107 can execute simultaneously, and may have their own system call wrappers 125 and initialization modules 123.

An operating system kernel 109 executes in operating system address space 105. Techniques known in the art are utilized to insert an interception module 111 into the operating system 117. In a preferred embodiment, the present invention dynamically loads an interception module 111 into the operating system kernel 109, while the kernel 109 is active. The interception module 111 is preferably in the form of object code, the functional features of which are described in detail below.

Pointers 114 to system calls 115 are located in an operating system interrupt vector table 113. It is to be understood that the term "interrupt vector table" as used herein denotes an area in operating system address space 105 in which there are stored the addresses of system calls. In the UNIX operating system, this part of the operating system is called the "interrupt vector table," and that term is used in this specification. Other operating systems employ different terminology to denote the same system component. An interrupt vector table by any other name is still within the scope of the present invention.

The present invention makes a copy 116 of a pointer 114 to each system call 115 to be intercepted. These copies 116 of pointers 114 are preferably stored in operating system address space 105, but in an alternative embodiments are stored in user address space 103. Once the copies 116 have been made and saved, the present invention replaces the pointers 114 in the interrupt vector table 113 to the system calls 115 to be intercepted with pointers 118 to the interception module 111, such that when a system call 115 to be intercepted is made, the interception module 111 executes instead.

Executing alternative code when a system call 115 is made comprises intercepting the system call 115. The steps of inserting an interception module 111 into the operating system 117, making a copy 116 of an operating system pointer 114 to a system call 115, and replacing the operating system pointer 114 with a pointer 118 to the interception module 111 facilitate interception of a system call 115. When a call is made to a system call 115 to be intercepted, the operating system 117 uses the pointer 118 in the interrupt vector table 113 to the interception module 111 to execute the interception module 111.

It is to be understood that in the present invention, not all system calls 115 need be intercepted. Only pointers 114 to system calls 115 to be intercepted are replaced with pointers 118 to the interception module 111. Pointers 114 to system calls 115 which are not to be intercepted are not replaced. Thus, when a non-intercepted system call 115 is made, the system call 115 executes, not the interception module 111.

Processes 107 that are selected to intercept system calls 115 are loaded into process address space 119 by a modified loader program 121. As explained above, a loader program is an operating system utility that is used to execute computer programs that are stored on static media. A loader program typically executes in user address space 103. When a user attempts to execute a computer program (for example by typing the name of an executable file at a command line, or by clicking on an icon associated with the program), the loader program executes and proceeds to load an executable image from static media into process address space 119, and then to initiate execution of the loaded image by transferring execution to the first instruction thereof.

The present invention utilizes a modified loader program 121 to load select processes 107 that are to intercept system calls 115. Like a standard loader program, the modified loader 121 loads executable images from static media into process address space 119. Additionally, the modified loader 121 loads an initialization module 123 and a system call wrapper 125 into the process address space 119 of the loaded executable image. Both the initialization module 123 and the system call wrapper 125 comprise executable object code.

The initialization module 121 includes object code to associate the system call wrapper 125 with a select process 107. The system call wrapper 125 includes object code to be executed instead of intercepted system calls 115.

Rather than executing the process 107 itself, the modified loader 121 executes the loaded initialization module 123. The initialization module 123 registers an entry point in the system call wrapper 125 for the selected process 107 with the interception module 111. Preferably, the interception module 111 maintains an association table 127 of process identifiers (or in alternative embodiments, alternative process identifying data such as process names) of select processes 107 and system call wrapper 125 entry points (or in alternative embodiments, alternative system call wrapper identifying data such as system call wrapper numbers). The initialization module 123 updates the association table 127 in the interception module 111 by adding an entry comprising the process identifier of the selected process 107 and the entry point in the system call wrapper 125 that is loaded in the process address space 119 of the select process 107. Thus, when the interception module 111 executes in response to the calling of a system call 115, the interception module 111 can determine if the calling process 107 is associated with a system call wrapper 125. In alternative embodiments of the present invention, the associations are stored in a format other than a table, for example a linked list. In alternative embodiments, the associations are stored not in the interception module 111, but in user address space 103 or operating system address space 105 as desired.

The initialization module 123 also creates a small memory area in the system call wrapper 125 (or alternatively in user address space 103 or operating system address space 105 as desired). This memory area is called the return address area 129, and its function is discussed in detail below. Additionally, the initialization module 123 sets the value of an execution flag 131 to indicate that the system call wrapper 125 is not currently executing. The execution flag 131 is preferably located in the system call wrapper 125, but may be located in the interception module 111, user address space 103, or operating system address space 105 as desired. The initialization module 123 then executes the process 107.

As stated above, only selected processes 107 are loaded by the modified loader program 121. Non-selected processes are loaded with the standard, default operating system loader program, which simply loads and executes the process. Thus, non-selected process do not have system calls wrappers 105 associated therewith. Therefore, selected processes 107 intercept system calls 115, and non-selected processes do not.

The loading of selected processes 107 and non-selected processes with two different loader programs is possible because multitasking operating systems such as UNIX allow the use of multiple loader programs. The decision as to which processes 107 are to be loaded with the modified loader program 107 can be made by a system administrator, or by a user. A system administrator can limit access to the modified loader program 121, and thus limit the ability of users to specify which processes will be selected.

If a process spawns a child process, the child process is, by default, automatically loaded by the loader of the parent process. Thus child processes of selected processes will, by default, be selected processes, and vice versa. Of course, the parent process can overwrite the default loader settings, so both selected and non-selected processes can spawn both selected and non-selected processes as desired.

In an alternative embodiment of the present invention, a single, modified loader program 121 is utilized to load both selected processes 107 and non-selected processes. In that embodiment, a list of selected processes is stored in computer memory 101. The list is preferably dynamic, and can be updated with additions or deletions as desired. The modified loader program 121 utilizes the list to determine if a process to be loaded is a selected process 107. If so, the modified loader program 121 loads the selected process 107, the system call wrapper 125, and the initialization module 123, as described above. If the process is not selected, the modified loader 121 simply loads the process in the manner of a default loader program.

Both selected processes 107 and non-selected processes execute in user address space 103 under control of the operating system 117. Executing processes make system calls 115. When a process makes a system call 115 that is to be intercepted, the interception module 111 executes. The interception module 111 examines the association table 127 to determine whether the process that made the system call 115 is associated with a system call wrapper 125. If the process is not so associated, the process is not a selected process 107. In this case, the interception module 111 utilizes the saved copy of the pointer 116 to make the system call 115 for the process. If, on the other hand, the process is associated with a system call wrapper 125, the process is a selected process 107, and the interception module 111 prepares to execute the system call wrapper 125 which has been loaded into the process address space 119 of the calling process 107.

In one embodiment, the interception module 111 first examines the execution flag 131 to determine whether the system call wrapper 125 is currently executing. If the system call wrapper 125 associated with the selected process 107 is currently executing, then the system call 115 was made by the wrapper 125. Recall that the system call wrapper 125 executes in the process address space 119 of the selected process 107. Therefore, the system call wrapper 125 is actually a part of the process 107, and has the same process identifier. If a system call 115 is made by the process 107, and the section of the process 107 that is executing is the system call wrapper 125, then the system call 115 must have been made by the wrapper 125. An exception is the special case of single processes with multiple threads of execution, discussed in detail below.

If the system call wrapper 125 has made a system call 115, it is desirable to execute the actual system call 115, and not recursively execute the wrapper 125. When a system call wrapper 125 is programmed to make a system call 115, it is the intent of the programmer that the actual system call 115 execute. It is commonly desirable for the system call wrapper 125 to utilize operating system resources. Like any process, the system call wrapper 125 utilizes such resources by making a system call 115. Thus, when the system call 115 was made by the wrapper 125, the interception module 111 uses the saved copy of the pointer 116 to make the system call 115.

On the other hand, if the system call wrapper 125 is not currently executing, the interception module 111 must execute it. To do so, the interception module 111 first writes, to the return address area 129 of the system call wrapper 125, the address to which to return execution after the system call wrapper 125 terminates. This is the address of the instruction in the calling process 107 immediately after the instruction to make the system call 115. The interception module 111 has access to this address because it was pushed onto the stack prior to executing the code pointed to by the pointer in the interrupt vector table 113. The address is pushed onto the stack so that the code can return execution to the address after terminating. In the case of a non-intercepted system call 115, the code pointed to is the system call 115 itself, which utilizes the pushed address to return control to the calling process after executing. However, when the system call 115 has been intercepted by the present invention, the interception module 111 is pointed to rather than the system call 115. Because the interception module 111 will transfer execution to a system call wrapper 125 in the process address space 117 of the calling process 107, the interception module 111 writes the pushed address to the return address area 131 of the wrapper 125, so that the wrapper 125 can return execution to the proper instruction in the calling process 107 once it has terminated.

Next, the interception module 111 sets the execution flag 131 to indicate that the system call wrapper 125 is currently executing. Alternatively the system call wrapper 125 sets the flag 131 to so indicate. In alternative embodiments, indication that the system call wrapper 125 is currently executing is indicated not by a flag but by an alternative indicator, such as an entry in a table. Regardless, the interception module 111 transfers execution to the entry point in the system call wrapper 125. The system call wrapper 125 proceeds to execute in the process address space 117 of the selected process 107 that made the system call 115.

When the system call wrapper 125 finishes executing, it sets the execution flag 131 (or alternative indicator) to indicate that it is not currently executing. Then, the system call wrapper 125 transfers execution to the address stored in the return address area 129.

In multitasking operating systems, a single process can simultaneously execute multiple threads of execution. Therefore, the present invention takes into account the case in which a thread of a selected process 107 makes a system call 115 to be intercepted, while the system call wrapper 125 associated with the process 107 is executing in response to an intercepted system call 115 made by another thread of the same process 107. Because the system call wrapper 125 is executing, the execution flag 131 will so indicate and thus, without more, system calls 115 made by the process 107 will not be intercepted. Yet, it is desirable to intercept system calls 115 made a process is 107 thread which is not currently executing the system call wrapper 125.

Threads can be implemented at a process level (user level threads) or at an operating system level (kernel level threads). Kernel level threads utilize operating system resources to provide multiple, bona fide threads of execution per process. Some operating systems, such as 32 bit versions of Microsoft Windows ®, automatically create an independent copy of the global variables of a threaded process for each thread thereof. Thus, each thread of a selected processes 107 executing under such an operating system has its own copy of all of the global variables of the process 107, including the execution flag 131. Therefore, if one thread intercepts a system call 115 and executes the system call wrapper 125, the copy of the execution flag 131 pertaining to that thread will indicate that the system call wrapper 125 is executing, and subsequent system calls 115 made by that thread will not be intercepted. The copies of the execution flag 131 of threads not executing the system call wrapper 125 will indicate accordingly, and thus system calls 115 made by threads not executing the system call wrapper 125 will be intercepted.

Some multitasking operating systems, such as Linux, do not automatically provide an independent copy of global variables for each thread of a process. Embodiments of the present invention that execute under the control of such operating systems provide that functionality. Such embodiments intercept all system calls 115 that create threads, make a copy of the global variables of the process for the thread being created, and insert a pointer to the created copy in the local descriptor table of the thread, the local descriptor table being automatically provide by the operating system.

User level threads do not utilize operating system resources, or provide bona fide threads of execution. Instead, user level threads simulate multiple threads of execution with a set of localized library functions. Because operating system resources are not employed to create the threads, the operating system has no record of the existence of the threads. Therefore, the simulated threads are unable to interact with the operating system as if they were actual independent threads of execution. Because of this, only one system call 115 per process can be serviced at a time, and no execution flag 131 conflicts can occur.

SYSTEM CALL WRAPPERS IN USER ADDRESS SPACE

Figure 2:
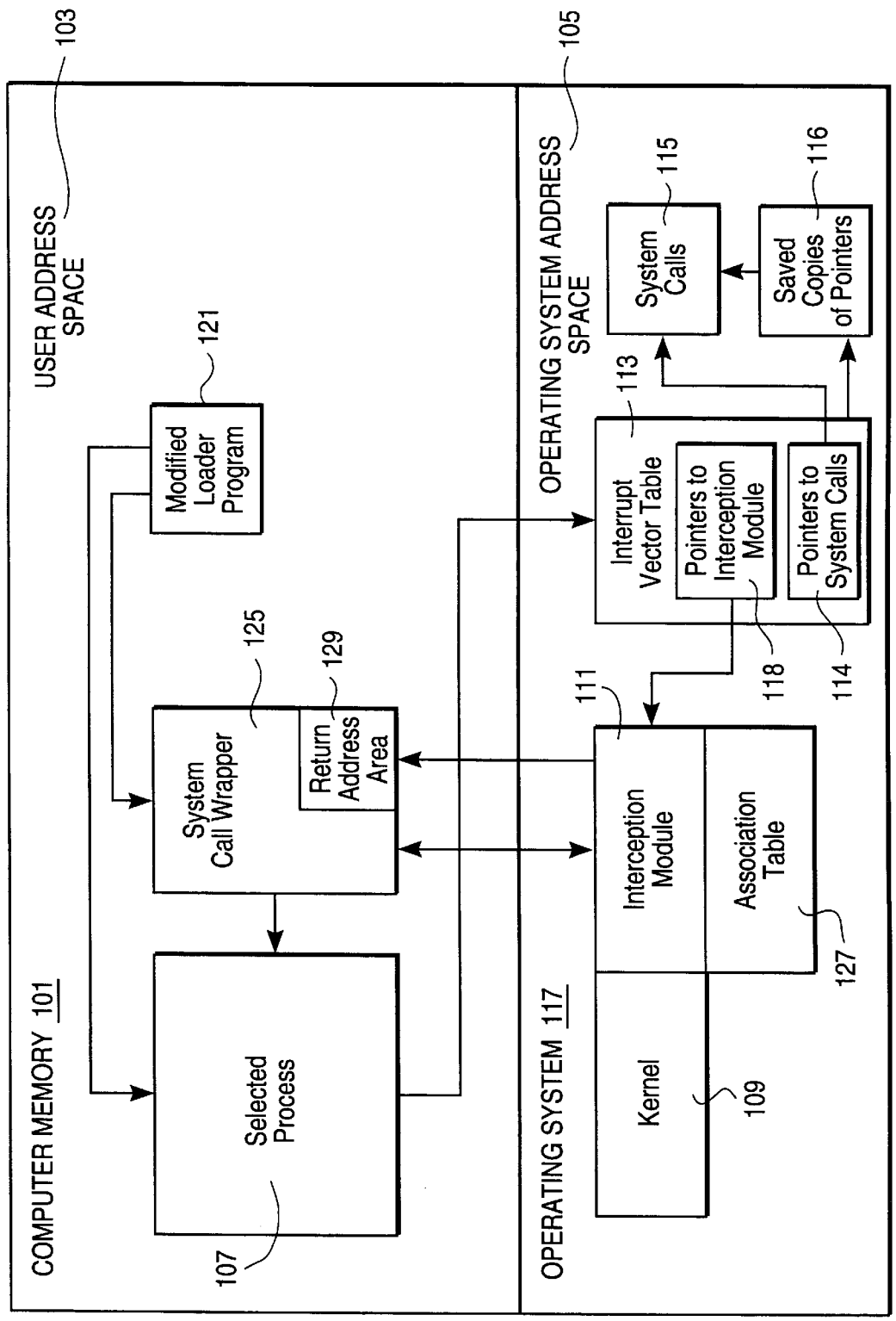
FIG. 2 is a block diagram illustrating a system for selectively intercepting system calls according to another embodiment of the present invention.

FIG. 2 is a block diagram illustrating a system for selectively intercepting system calls 115 according to another embodiment of the present invention. In the embodiment of FIG. 2, system call wrappers 125 execute in user address space 103, but not in the process address space 119 of any specific process.

As in the embodiment of FIG. 1, at least one process 107 executes in user address space 103, an operating system kernel 109 executes in operating system address space 105, and an interception module 111 is inserted into the operating system 117. The present invention makes and saves copies 116 of pointers 114 to each system call 115 to be intercepted, and then replaces the copied pointers 114 with pointers 118 to the interception module 111.

As with the embodiment of FIG. 1, selected processes 107 are loaded into process address space 119 by a modified loader program 121. However, the modified loader program 121 of the embodiment of FIG. 2 operates somewhat differently. The modified loader 121 loads an executable image from static media into process address space 119, but does not load an initialization module 123. The modified loader 201 does load a system call wrapper 125 associated with the selected process 107, but into user address space 103 instead of process address space 119. Thus, each selected processes 107 has an associated system call wrapper 125, but the associated wrapper 125 executes as a separate process.

Rather than executing the process 107 itself, the modified loader 121 executes the system call wrapper 125. The wrapper 125 registers an entry point in itself for the selected process 107 with the interception module 111. As with the embodiment of FIG. 1, the interception module 111 maintains an association table 127 of process identifiers of select processes 107 and system call wrapper 125 entry points. The initialization module 123 updates the association table 127 in the interception module 111 by adding an entry comprising the process identifier of the selected process 107 and the entry point in its associated system call wrapper 125. Thus, when the interception module 111 executes in response to the calling of a system call 115, the interception module 111 can determine if the calling process 107 is associated with a system call wrapper 125. The system call wrapper 125 also creates a return address area 129 in itself. Then, the system call wrapper 125 returns execution control to the modified loader program 121, which executes the selected process 107.

As stated above, only selected processes 107 are loaded by the modified loader program 121. Non-selected processes are loaded with the standard, default operating system loader program, which simply loads and executes the process. Thus, non-selected process do not have system calls wrappers 105 associated therewith. Therefore, selected processes 107 intercept system calls 115, and non-selected processes do not.

As with the embodiment of FIG. 1, when a process makes a system call 115 the pointer 114 to which has been replaced with a pointer 118 to the interception module 111, the interception module 111 executes. The interception module 111 examines the association table 127 to determine whether the process that made the system call 115 is associated with a system call wrapper 125. If the process is not so associated, the process is not a selected process, and the interception module 111 makes the normal system call 115 for the process. If, on the other hand, the process is associated with a system call wrapper 125, the process is a selected process 107 and the interception module 111 prepares to execute the associated system call wrapper 125, using the stored entry point in the system call wrapper 125.

In the embodiment of FIG. 2, it is not necessary for the interception module 111 to examine or set an execution flag 131. Because the system call wrapper 125 executes as a separate process, system calls 115 made by the wrapper 125 are not intercepted. The selected process 107 and the system call wrapper 125 have distinct process identifiers, and thus system calls 115 made by the one can be distinguished from system calls 115 made by the other. Although an association is stored in the table 127 between the selected process 107 and its associated wrapper 125, in this embodiment the selected process 107 and its associated wrapper 125 are two separate processes. The process 107 itself is selected a selected process, but the associated wrapper 125 is not. Thus, system calls made by the selected process 107 are intercepted, but those made by the wrapper 125 are not.

The interception module 111 writes, to the return address area 129 of the system call wrapper 125, the address to which to return execution after the system call wrapper 125 terminates. Then, the interception module 111 transfers execution to the entry point in the system call wrapper 125. The system call wrapper 125 proceeds to execute in user address space 103. When the system call wrapper 125 finishes executing, it transfers execution to the address stored in the return address area 129.

SYSTEM CALL WRAPPERS IN OPERATING SYSTEM ADDRESS SPACE

Figure 3:
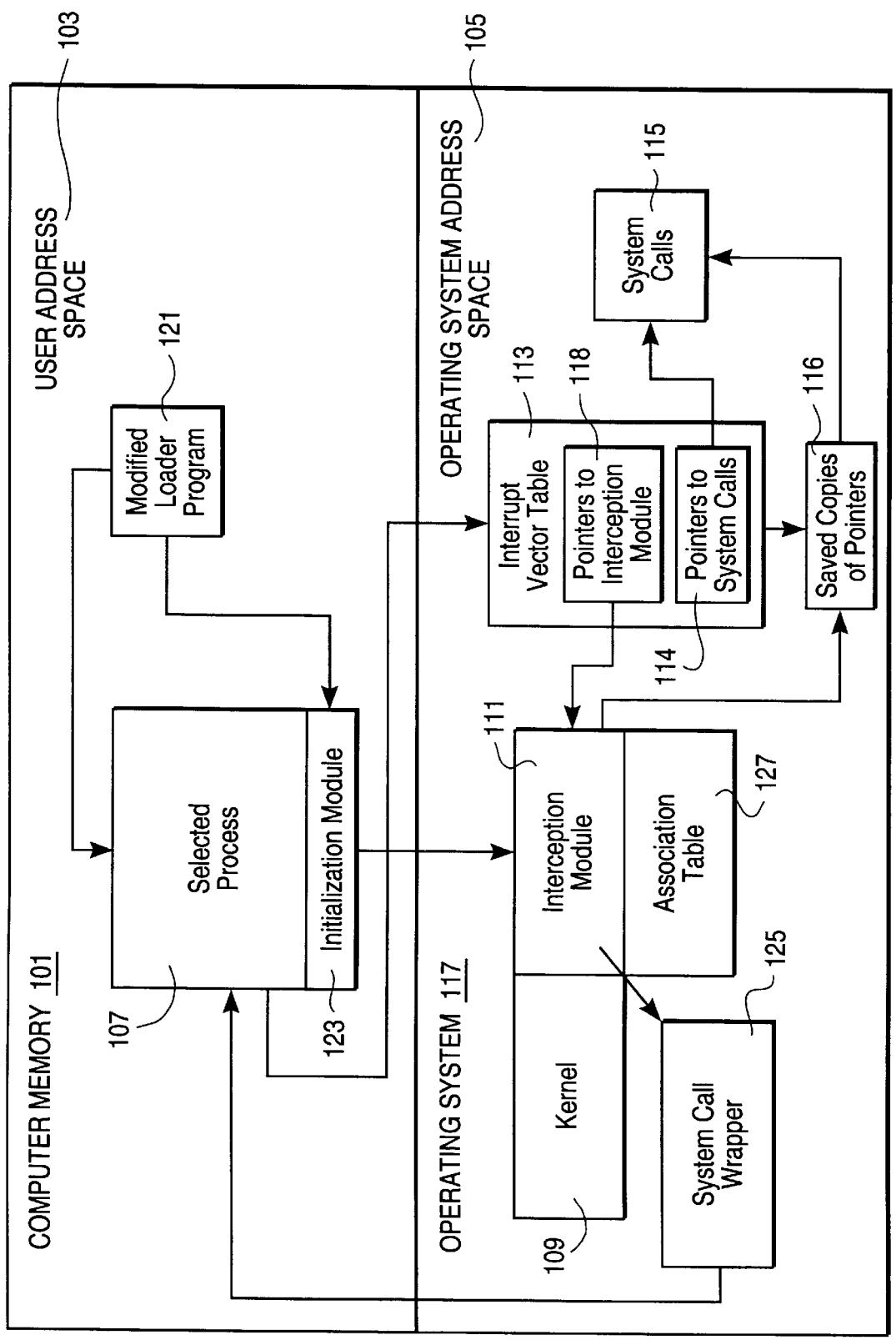
FIG. 3 is a block diagram illustrating a system for selectively intercepting system calls according to an alternative embodiment of the present invention.

FIG. 3 is a block diagram illustrating a system for selective interception of system calls 115 according to another embodiment of the present invention. In the embodiment of FIG. 3, system call wrappers 125 execute in operating system address space 105.

As in the embodiment of FIG. 1, at least one process 107 executes in user address space 103, an operating system kernel 109 executes in operating system address space 105, and an interception module 111 is inserted into the operating system 117. Additionally, at least one system call wrapper 125 is inserted into the operating system 117. Preferably, the system call wrapper 125 is loaded into an active kernel 109 as a kernel module. Copies 116 of pointers 114 to each system call 115 to be intercepted are saved, and then the copied pointers 114 are replaced with pointers 118 to the interception module 111.

As with the embodiment of FIG. 1, selected processes 107 are loaded into process address space 119 by a modified loader program 121. The modified loader program 121 of the embodiment of FIG. 3 loads an executable image and an initialization module 123 into process address space 119, but does not load a system call wrapper 125. The modified loader 121 proceeds to execute the initialization module 123, which registers an entry point in the system call wrapper 125 for the selected process 107 with the interception module 111.

As with the embodiment of FIG. 1, the interception module 111 maintains an association table 127 of process identifiers of select processes 107 and system call wrapper 125 entry points. The initialization module 123 updates the association table 127 in the interception module 111 by adding an entry comprising the process identifier of the selected process 107 and the entry point in the associated system call wrapper 125. Thus, when the interception module 111 executes in response to the calling of a system call 115, the interception module 111 can determine if the calling process 107 is associated with a system call wrapper 125. Next, the initialization module 123 executes the selected process 107.

As stated above, only selected processes 107 are loaded by the modified loader program 121. Non-selected processes are loaded with the standard, default operating system loader program, which simply loads and executes the process. Thus, non-selected process do not have system calls wrappers 105 associated therewith. Therefore, selected processes 107 intercept system calls 115, and non-selected processes do not.

As with the embodiment of FIG. 1, when a process makes an intercepted system call 115, the interception module 111 executes. The interception module 111 examines the association table 127 to determine whether the process that made the system call 115 is associated with a system call wrapper 125. If the process is not so associated, the process is not a selected process, and the interception module 111 makes the system call 115 for the process. If, on the other hand, the process is associated with a system call wrapper 125, the process is a selected process 107, and the interception module 111 executes the associated system call wrapper 125.

As with the embodiment of FIG. 2, in the embodiment of FIG. 3 it is not necessary for the interception module 111 to examine or set an execution flag 131. Because the system call wrapper 125 executes in operating system address space 105 as opposed to the process address space 119 of a selected process 107, system calls 115 made by the wrapper 125 are not intercepted.

In the embodiment of FIG. 3, it is also unnecessary for the interception module 111 to write a return address to a return address area 129 of a system call wrapper 125. After the system call wrapper 125 terminates, execution is automatically returned to the interception module 111. The system call wrapper 125 and the interception module 111 both execute in operating system address space 105, so no special steps need be taken to return execution from the system call wrapper 125 to the interception module 111.

The interception module 111 is called by the selected process 107, so the interception module 111 has the address of the instruction in the calling process 107 to which to transfer execution after the system call wrapper 125 has terminated. Therefore, once the system call wrapper 125 has terminated and execution has returned to the interception module 111, the interception module 111 returns execution control to the selected process 107.

Thus, to execute the system call wrapper 125, the interception module 111 simply transfers execution to the entry point in the system call wrapper 125. The system call wrapper 125 proceeds to execute in operating system address space 105. When the system call wrapper 125 finishes executing, execution returns to the interception module 111, which transfers execution back to the selected process 107.

In summary, the present invention allows for selective interception of system, by selected processes. In different embodiments of the present invention, system call wrappers execute in process address space, user address space, and operating system address space as desired.

What is claimed is:

1. A method in a computer system for selectively intercepting system calls made to a multitasking operating, the method comprising:

loading an interception module into the operating system;

replacing pointers to system calls to be intercepted with pointers to the interception module, such that calling one of the system calls causes the interception module to execute;

selecting at least one process to intercept system calls;

loading a system call wrapper into the process address space of at least one selected process; and upon execution of the interception module in response to a calling of one of the system calls, determining whether a process that called the system call is a selected process.

2. The method of claim 1 further comprising:

in response to determining that the process is a selected process, executing the system call wrapper loaded in the process address space of the selected process.

3. The method of claim 1 further comprising:

in response to determining that the process is not a selected process, executing a default system call.

4. The method of claim 1 wherein loading the interception module into the operating system comprises loading the interception module into a running operating system kernel.

5. The method of claim 1 further comprising:

loading an initialization module into the process address space of at least one select process;

executing the initialization module; and registering with the interception module, by the initialization module, an entry point in the loaded system call wrapper.

6. The method of claim 5 wherein the loading of at least one system call wrapper and the loading of the initialization module are performed by a modified operating system loader program, and the method further comprises:

utilizing the modified loader program to load at least one selected process into process address space.

7. The method of claim 1 further comprising:

storing an indicator of an association between a loaded system call wrapper and a selected process.

8. The method of claim 7 wherein the storing further comprises:

updating an association table in the interception module.

9. The method of claim 8 wherein:

determining whether a process that called the system call is a selected process comprises determining if an identifier of the process that called the system call is included in the association table.

10. The method of claim 1 further comprising:

upon execution of the interception module in response to a calling of one of the system calls by a selected process, storing an address to which to return execution; and upon completion of execution of the system call wrapper, returning execution to the stored address.

11. The method of claim 10 wherein the address to which to return execution is stored in the system call wrapper.

12. The method of claim 1 further comprising:

in response to determining that the process is a selected process, determining whether the system call wrapper loaded in the process address space of the selected process is currently executing.

13. The method of claim 12 further comprising:

in response to a determination that the system call wrapper is not currently executing, executing the system call wrapper.

14. The method of claim 1 further comprising:

upon loading the system call wrapper, setting an indicator to indicate that the system call wrapper is not currently executing.

15. The method of claim 12 further comprising:

prior to executing the system call wrapper, setting an indicator to indicate that the system call wrapper is currently executing.

16. The method of claim 12 further comprising:

upon completion of execution of the system call wrapper, setting an indicator to indicate that the system call wrapper is not currently executing.

17. The method of claim 12 further comprising:

in response to a determination that the system call wrapper is currently executing, executing a default system call.

18. A method in a computer system for selectively intercepting system calls made to a multitasking operating system, the method comprising:

loading an interception module into the operating system;

replacing pointers to system calls to be intercepted with pointers to the interception module, such that calling one of the system calls causes the interception module to execute;

selecting at least one process to intercept system calls;

loading at least one system call wrapper into user address space;

for each loaded system call wrapper, associating the system call wrapper with a selected process; and upon execution of the interception module in response to a calling of one of the system calls, determining whether a process that called the system call is a selected process.

19. The method of claim 18 further comprising:

in response to determining that the process is a selected process, executing the associated system call wrapper in user address space.

20. The method of claim 18 further comprising:

in response to determining that the process is not a selected process, executing a default system call.

21. The method of claim 18 wherein:

loading the interception module into the operating system comprises
loading the interception module into a running operating system kernel.

22. The method of claim 18 wherein:

associating the system call wrapper with a select process comprises
registering with the interception module, by the loaded system call wrapper, an entry point in the system call wrapper.

23. The method of claim 18 wherein the loading of at least one system call wrapper is performed by a modified operating system loader program, and the method further comprises:

utilizing the modified loader program to load at least one selected process into process address space.

24. The method of claim 18 further comprising:

storing an indicator of an association between a loaded system call wrapper and a selected process.

25. The method of claim 24 wherein the storing further comprises:

updating an association table in the interception module.

26. The method of claim 25 wherein:

determining whether a process that called the system call is a selected process comprises determining if an identifier of the process that called the system call is included in the association table.

27. The method of claim 18 further comprising:

upon execution of the interception module in response to a calling of one of the system calls by a selected process, storing an address to which to return execution; and upon completion of execution of the system call wrapper, returning execution to the stored address.

28. The method of claim 27 wherein the address to which to return execution is stored in the system call wrapper.

29. A method in a computer system for selectively intercepting system calls made to a multitasking operating system, the method comprising:

replacing pointers to system calls to be intercepted with pointers to object code, such that calling one of the system calls causes the object code to execute;

selecting at least one process to intercept system calls;

loading at least one system call wrapper into user address space; and upon execution of the object code in response to a calling of one of the system calls, determining whether a process that called the system call is a selected process.

30. The method of claim 29 further comprising:

in response to determining that the process is a selected process, executing a system call wrapper in user address space.

31. The method of claim 29 further comprising:

in response to determining that the process is not a selected process, executing a default system call in operating system address space.

32. The method of claim 29 further comprising: storing an indicator of an association between a loaded system call wrapper and a selected process.

33. A method in a computer system for selectively intercepting system calls made to a multitasking operating system, the method comprising:

loading a system call wrapper into operating system address space;

replacing pointers to system calls to be intercepted with pointers to the system call wrapper, such that calling one of the system calls causes the system call wrapper to execute;

selecting at least one process to intercept system calls;

determining whether a process that called a system call is a selected process; and in response to a determination that the process that called the system call is a selected process, executing the system call wrapper.

34. The method of claim 33 wherein loading a system call wrapper into operating system address space comprises loading the system call wrapper into a running operating system kernel.

35. The method of claim 33 further comprising:

storing a list of identifiers of selected processes for which system calls will be intercepted; and wherein determining whether a process that called a system call is a select process comprises determining if an identifier of the process that called the system call is included in the list.

36. The method of claim 33 further comprising:

saving pointers to system calls to be intercepted; and in response to a determination that the process that called the system call is not a select process, utilizing a saved pointer to execute the system call.

37. A computer program product for selectively intercepting system calls made to a multitasking operating, the computer program product comprising:

program code for loading an interception module into the operating system;

program code for replacing pointers to system calls to be intercepted with pointers to the interception module, such that calling one of the system calls causes the interception module to execute;

program code for selecting at least one process to intercept system calls;

program code for loading a system call wrapper into the process address space of at least one selected process;

program code for, upon execution of the interception module in response to a calling of one of the system calls, determining whether a process that called the system call is a selected process; and a computer readable medium on which the program codes are stored.

38. The computer program product of claim 37 further comprising:

program code for, in response to determining that the process is a selected process, executing the system call wrapper loaded in the process address space of the selected process.

39. The computer program product of claim 37 further comprising:

program code for, in response to determining that the process is not a selected process, executing a default system call.

40. The computer program product of claim 37 further comprising:

program code for loading the interception module into a running operating system kernel.

41. The computer program product of claim 37 further comprising:

program code for loading an initialization module into the process address space of at least one select process;

program code for executing the initialization module; and program code for registering with the interception module, by the initialization module, an entry point in the loaded system call wrapper.

42. The computer program product of claim 41 further comprising:

program code comprising a modified loader program for the loading of at least one system call wrapper and the loading of the initialization module.

43. The computer program product of claim 37 further comprising:

program code for storing an indicator of an association between a loaded system call wrapper and a selected process.

44. The computer program product of claim 43 further comprising:
program code for updating an association table in the interception module.

45. The computer program product of claim 44 further comprising:
program code for determining whether a process that called the system call is a selected process comprises determining if an identifier of the process that called the system call is included in the association table.

46. The computer program product of claim 37 further comprising:
program code for, upon execution of the interception module in response to a calling of one of the system calls by a selected process, storing an address to which to return execution; and
program code for, upon completion of execution of the system call wrapper, returning execution to the stored address.

47. The computer program product of claim 46 further comprising:
program code for storing, in the system call wrapper, the address to which to return execution.

48. The computer program product of claim 37 further comprising:
program code for, in response to determining that the process is a selected process, determining whether the system call wrapper loaded in the process address space of the selected process is currently executing.

49. The computer program product of claim 48 further comprising:
program code for, in response to a determination that the system call wrapper is not currently executing, executing the system call wrapper.

50. The computer program product of claim 37 further comprising:
program code for, upon loading the system call wrapper, setting an indicator to indicate that the system call wrapper is not currently executing.

51. The computer program product of claim 48 further comprising:
program code for, prior to executing the system call wrapper, setting an indicator to indicate that the system call wrapper is currently executing.

52. The computer program product of claim 48 further comprising:
program code for, upon completion of execution of the system call wrapper, setting an indicator to indicate that the system call wrapper is not currently executing.

53. The computer program product of claim 48 further comprising:
program code for, in response to a determination that the system call wrapper is currently executing, executing a default system call.

54. A computer program product for selectively intercepting system calls made to a multitasking operating system, the computer program product comprising:
program code for loading an interception module into the operating system;
program code for replacing pointers to system calls to be intercepted with pointers to the interception module, such that calling one of the system calls causes the interception module to execute;
program code for selecting at least one process to intercept system calls;
program code for loading at least one system call wrapper into user address space;
program code for associating each loaded system call wrapper with a selected process;
program code for, upon execution of the interception module in response to a calling of one of the system calls, determining whether a process that called the system call is a selected process; and
a computer readable medium on which the program codes are stored.

55. The computer program product of claim 54 further comprising:
program code for, in response to determining that the process is a selected process, executing the associated system call wrapper in user address space.

56. The computer program product of claim 54 further comprising:
program code for, in response to determining that the process is not a selected process, executing a default system call.

57. The computer program product of claim 54 further comprising:
program code for loading the interception module into the operating system comprises loading the interception module into a running operating system kernel.

58. The computer program product of claim 54 further comprising:
program code for associating the system call wrapper with a select process comprises registering with the interception module, by the loaded system call wrapper, an entry point in the system call wrapper.

59. The computer program product of claim 54 further comprising:
program code for loading of at least one system call wrapper by a modified operating system loader program.

60. The computer program product of claim 54 further comprising:
program code for storing an indicator of an association between a loaded system call wrapper and a selected process.

61. The computer program product of claim 60 further comprising:
program code for updating an association table in the interception module.

62. The computer program product of claim 61 further comprising:
program code for determining whether a process that called the system call is a selected process comprises determining if an identifier of the process that called the system call is included in the association table.

63. The computer program product of claim 54 further comprising:
program code for upon execution of the interception module in response to a calling of one of the system calls by a selected process, storing an address to which to return execution; and
program code for, upon completion of execution of the system call wrapper, returning execution to the stored address.

64. The computer program product of claim 63 further comprising:
program code for storing, in the system call wrapper, the address to which to return execution.

65. A computer program product for selectively intercepting system calls made to a multitasking operating system, the computer program product comprising:
- program code for replacing pointers to system calls to be intercepted with pointers to object code, such that calling one of the system calls causes the object code to execute;
- program code for selecting at least one process to intercept system calls;
- program code for loading at least one system call wrapper into user address space;
- program code for upon execution of the object code in response to a calling of one of the system calls, determining whether a process that called the system call is a selected process; and
- a computer readable medium on which the program codes are stored.

66. The computer program product of claim 65 further comprising:
- program code for, in response to determining that the process is a selected process, executing a system call wrapper in user address space.

67. The computer program product of claim 65 further comprising:
- program code for, in response to determining that the process is not a selected process, executing a default system call in operating system address space.

68. The computer program product of claim 65 further comprising:
- program code for storing an indicator of an association between a loaded system call wrapper and a selected process.

69. A computer program product for selectively intercepting system calls made to a multitasking operating system, the computer program product comprising:
- program code for loading a system call wrapper into operating system address space;
- program code for replacing pointers to system calls to be intercepted with pointers to the system call wrapper, such that calling one of the system calls causes the system call wrapper to execute;
- program code for selecting at least one process to intercept system calls;
- program code for determining whether a process that called a system call is a selected process;
- program code for, in response to a determination that the process that called the system call is a selected process, executing the system call wrapper; and
- a computer readable medium on which the program codes are stored.

70. The computer program product of claim 69 further comprising:
- program code for loading the system call wrapper into a running operating system kernel.

71. The computer program product of claim 69 further comprising:
- program code for storing a list of identifiers of selected processes for which system calls will be intercepted; and
- program code for determining if an identifier of the process that called the system call is included in the list.

72. The computer program product of claim 69 further comprising:
- program code for saving pointers to system calls to be intercepted; and
- program code for, in response to a determination that the process that called the system call is not a select process, utilizing a saved pointer to execute the system call.

* * * * *